United States Patent
Anderson et al.

(10) Patent No.: US 7,838,582 B2
(45) Date of Patent: Nov. 23, 2010

(54) HYPERDISPERSANT FOR USE IN FLUOROCARBON COATING COMPOSITIONS

(75) Inventors: James L. Anderson, Howell, MI (US); David Lindow, Farmington Hills, MI (US); Donald J. Algrim, Howell, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 852 days.

(21) Appl. No.: 11/684,823

(22) Filed: Mar. 12, 2007

(65) Prior Publication Data

US 2007/0185249 A1 Aug. 9, 2007

Related U.S. Application Data

(63) Continuation-in-part of application No. 11/275,916, filed on Feb. 3, 2006.

(51) Int. Cl.
*C08G 59/50* (2006.01)

(52) U.S. Cl. .................. 524/243; 523/414; 564/348; 564/414

(58) Field of Classification Search ................. 524/243; 523/414; 564/348, 506
See application file for complete search history.

(56) References Cited

U.S. PATENT DOCUMENTS

| | | | |
|---|---|---|---|
| 3,037,006 A | 5/1962 | Hankins et al. | |
| 3,668,193 A | 6/1972 | King | |
| 3,944,689 A | 3/1976 | Luckock et al. | |
| 4,157,996 A | 6/1979 | Boldebuck et al. | |
| 4,433,104 A | 2/1984 | Giles, Jr. | |
| 4,770,939 A | 9/1988 | Sietsess et al. | |
| 4,816,516 A | 3/1989 | Yamaya et al. | |
| 5,030,394 A | 7/1991 | Sietsess et al. | |
| 5,185,403 A | 2/1993 | Lewarchik et al. | |
| 5,284,893 A | 2/1994 | Kubo et al. | |
| 5,310,770 A * | 5/1994 | DeGooyer et al. | 523/414 |
| 5,516,837 A | 5/1996 | Tsutsumi et al. | |
| 5,700,578 A | 12/1997 | Korney, Jr. et al. | |
| 5,959,022 A | 9/1999 | Lin et al. | |
| 6,017,639 A | 1/2000 | Higginbotham et al. | |
| 6,037,412 A | 3/2000 | Rijkse et al. | |
| 6,255,398 B1 | 7/2001 | Zupancic et al. | |
| 6,313,222 B1 | 11/2001 | Lin et al. | |
| 6,551,708 B2 * | 4/2003 | Tsuda et al. | 428/402 |
| 6,679,943 B1 | 1/2004 | Newton et al. | |
| 6,699,933 B2 | 3/2004 | Nguyen et al. | |
| 2005/0067284 A1 | 3/2005 | Nishiguchi et al. | |

FOREIGN PATENT DOCUMENTS

| | | | |
|---|---|---|---|
| EP | 0 131 419 A1 | | 1/1985 |
| EP | 0 219 928 A2 | | 4/1987 |
| EP | 219928 A2 | * | 4/1987 |
| WO | WO-98/17723 | * | 4/1998 |
| WO | WO 98/17723 A1 | | 4/1998 |
| WO | WO 2007/092663 A2 | | 8/2007 |

OTHER PUBLICATIONS

International Search Report dated Mar. 3, 2008 for International Application No. PCT/US2007/083587, 4 pages.

* cited by examiner

*Primary Examiner*—Peter D. Mulcahy
*Assistant Examiner*—Henry Hu
(74) *Attorney, Agent, or Firm*—Donald R. Palladino

(57) ABSTRACT

A hyperdispersant for use in a fluorocarbon coating composition is disclosed. The fluorocarbon coating composition generally comprises a fluorocarbon resin, a binder resin, a cross-linking agent, and the hyperdispersant. The hyperdispersant comprises the reaction product of a polyglycidyl oligomer and at least one amino compound. The polyglycidyl oligomer comprises a carbon chain having from 1 to 25 carbon atoms with at least one of an internal ether linkage and an internal ester linkage and comprises a plurality of epoxy groups. The at least one amino compound has a cyclic, heterocyclic, alkyl, or heteroalkyl structure substituted with at least one primary or secondary amine group for reacting with and opening at least one of the epoxy groups.

14 Claims, No Drawings

HYPERDISPERSANT FOR USE IN FLUOROCARBON COATING COMPOSITIONS

CROSS-REFERENCE TO RELATED APPLICATIONS

This application is a continuation-in-part of U.S. patent application Ser. No. 11/275,916, filed Feb. 3, 2006.

BACKGROUND OF THE INVENTION

1. Field of the Invention

The subject invention generally relates to a hyperdispersant. More specifically, the hyperdispersant of the subject invention is useful in fluorocarbon coating compositions.

2. Description of the Related Art

Fluorocarbon resins, such as polyvinylidene fluoride (PVDF), are useful in formulating coatings with excellent weathering resistance. It is common to add binder resins, or hyperdispersants, to fluorocarbon coating compositions because fluorocarbon resins have poor rheology and pigment wetting characteristics. To achieve optimal weathering and chemical resistance, high fluorocarbon resin content is desired in the coating compositions. Many coating applications call for coating compositions having 70 weight percent or more fluorocarbon resins and the remainder is the binder resin. Coating compositions containing fluorocarbon resins, particularly PVDF, and binder resins tend to have relatively high viscosities. For some coating applications, particularly coil coating applications, it would be desirable to have high fluorocarbon resin content in conjunction with the binder resin, but with lower viscosity than is currently possible with the related art compositions.

Typical binder resins that have been previously utilized with fluorocarbon coating compositions have hydroxyl and amine functionality because of the improved mechanical and chemical resistance that results from such functionality. However, the source of such binder resins and hyperdispersants has previously been limited. The primary hyperdispersant is 3-(2-methacryloxyethyl)-2,2-spirocyclohexyl oxazolidine (MESO) and the MESO monomers are becoming increasingly difficult and/or more expensive to obtain due to the high cost of manufacturing.

Because MESO monomers are difficult to obtain, some related art methods have manipulated the binder resin during formation. For example, the binder resins have been polymerized from acrylic acids and acrylic esters having no additional functionality, acrylic acids, and acrylic esters having additional functionality, and an acryloxyalkyl oxazolidine. The functional acrylic acid/esters provide sites for cross-linking with cross-linking agents. The acryloxyalkyl oxazolidine reduces the viscosity of the fluorocarbon resin and acrylic resin dispersion. Other attempts to lower viscosity of the acrylic resin have included polymerizing and/or reacting the acrylic resin with polyimides, amino groups, epoxy groups, and the like. However, these modified acrylic resins do not perform as well as acrylic resins modified with MESO.

A co-pending patent application, which is commonly owned by the Assignee of the subject invention, described a novel method of formulating the binder resin from commercially available components such that the binder resin performed as well as, if not better, than the acrylic resins modified with MESO. In the co-pending patent application, a first component was an acrylic resin having an epoxy group that was reacted with an amino compound having a primary or secondary amine to open the epoxy group. Even though such a binder resin performed well, it was discovered that during commercial utilization contaminates would react with (or prevent reaction of) the epoxy group leaving limited sites available for the amine group to react. Thus, the binder resin did not as effectively disperse the fluorocarbon resin because the binder resin had limited functionality.

Accordingly, it would advantageous to provide a hyperdispersant that adequately lowers viscosity and that provides desired pigment wetting characteristics when incorporated into a coating composition. Further, it would be advantageous to provide a method of forming the hyperdispersant from monomers and starting components that are commercially available and that are relatively inexpensive such that manufacturing coating compositions that include the hyperdispersant is not cost prohibitive.

SUMMARY OF THE INVENTION AND ADVANTAGES

The subject invention provides a hyperdispersant for use in fluorocarbon coating compositions. The hyperdispersant comprises the reaction product of a polyglycidyl oligomer and at least one amino compound. The polyglycidyl oligomer comprises a carbon chain having from 1 to 25 carbon atoms with at least one internal ether and ester linkage and comprises a plurality of epoxy groups. The hyperdispersant has at least one amino compound having a cyclic, heterocyclic, alkyl, or heteroalkyl structure substituted with at least one primary or secondary amine group for reacting with and opening at least one of the epoxy groups. The resultant hyperdispersant has amine functionality from the amino compound to aid in dispersion of fluorocarbon resins and has hydroxyl functionality from opening at least one of the epoxy groups to enhance cross-linking with cross-linking agents in the fluorocarbon coating composition.

The fluorocarbon coating composition formed according to the subject invention comprises a fluorocarbon resin, a binder resin, a cross-linking agent, and the hyperdispersant. The hyperdispersant has amine functionality from the amino compound to aid in dispersion of the fluorocarbon resin and hydroxyl functionality from opening at least one of the epoxy groups to enhance cross-linking with cross-linking agents. Said another way, the amine functionality from the amino compound lowers the viscosity of the coating composition such that the subject invention may replace binder resins or hyperdispersants that utilize acryloxyalkyl oxazolidine and specifically those that utilize MESO in large amounts.

The subject invention overcomes the inadequacies that characterize the related art binder resins, hyperdispersants and fluorocarbon coating compositions. Specifically, the subject invention provides the hyperdispersant having a plurality of hydroxyl groups resulting from the opening of the plurality of epoxy groups. When the hyperdispersant only has a single hydroxyl group as disclosed in commonly owned and co-pending U.S. patent application Ser. No. 11/275,916, contaminants present while forming the coating composition may react with the hydroxyl group, thereby reducing the effectiveness of the hyperdispersant. Therefore, the plurality of hydroxyl groups is able to compensate for any contaminants while also effectively dispersing the fluorocarbon resins. The subject invention also prepares the hyperdispersant from commercially available and relatively inexpensive monomers such that manufacturing cost may be reduced by incorporating the hyperdispersant into coating compositions. Further, the viscosity of the coating composition is sufficiently lowered as a result of incorporating the hyperdispersant formed according to the subject invention.

DETAILED DESCRIPTION OF THE INVENTION

A hyperdispersant for use in fluorocarbon coating compositions is disclosed. The fluorocarbon coating composition generally comprises a fluorocarbon resin, a binder resin (or dispersant resin), a cross-linking agent, the hyperdispersant, solvent, and additives. It is to be appreciated by those of ordinary skill in the art that other binder resins, particularly non-amino resins, may be used in the fluorocarbon coating composition.

The binder resin is preferably an acrylic binder resin. The acrylic binder resin comprises the reaction product of multiple acrylic or acrylic monomers. The acrylic binder resin is generally present in an amount of from about 10 to about 60 percent based on the total weight of the coating composition. Suitable examples of acrylic for forming the binder resin include, but are not limited to, methyl methyacrylate, ethyl methacrylate, and hydroxyethyl methacrylate.

Suitable fluorocarbon resins for use in the subject invention include polyvinylidine fluoride (PVDF), such as those sold under the trademark Kynar; polyvinyl fluoride, polytetrafluoroethylene; copolymers of vinylidene fluoride and tetrafluoroethylene, such as that sold under the trademark Kynar SL; a fluoroethylene/vinyl ester/vinyl ether sold under the trademark Fluonate; proprietary vinylidene fluoride-based polymers sold under the trademarks Kynar 500 and Kynar SL; and mixtures of the fluorocarbon resins. The fluorocarbon resins have a high molecular weight, typically having a molecular weight (weight average) in the range of about 100,000 to about 500,000. The fluorocarbon resins are preferably utilized in powder form. The powders are generally insoluble in solvents used in the coating compositions of the present invention, but are swelled by the solvents, which increases the viscosity of the coating composition.

The fluorocarbon resin is present in an amount of from about 20 to about 50 percent based on the total weight of the coating composition, typically from about 25 to about 45 percent, and preferably from about 25 to about 35 percent. In order to achieve optimal chemical and mechanical resistance, it is desirable for the binder and fluorocarbon resin to be present in an amount of about 70 percent of the total resin content. When the amount of the binder and fluorocarbon resin is above 70 percent, only minor improvements in chemical and mechanical resistance may be achieved, but the costs significantly increase due to the high cost of the fluorocarbon resins.

The cross-linking agent may be an aminoplast resin, such as a melamine/formaldehyde resin or a melamine urea resin. Other suitable cross-linking agents include isocyanates, blocked isocyanates, organosilanes, and glycol ureas. The cross-linking agent is generally selected to be substantially non-reactive with the hyperdispersant at ambient temperatures, but to cross-link with the same at an elevated curing temperature, e.g., the curing temperature for a substrate to which the coating composition is applied. The cross-linking agent is typically employed in an amount of from about 0.2 to about 10 percent based on the total weight of the coating composition.

The hyperdispersant generally comprises the reaction product of a polyglycidyl oligomer and at least one amino compound. The polyglycidyl oligomer comprises a carbon chain having from 1 to 25 carbon atoms with at least one of an internal ether linkage and an internal ester linkage and comprises a plurality of epoxy groups. Preferably, the carbon chain has from 1 to 20 and more preferable from 1 to 15 carbon atoms. It is to be understood by those of ordinary skill in the art that if an ester linkage is present, then the carbon atom bonded to the two oxygen atoms is not included in the number of carbon atoms in the carbon chain. The carbon chain is selected from linear, branched, and combinations thereof. In other words, the carbon chain may include linear sections, branched sections, or both. Alternatively, the carbon chain may be selected from aliphatic, alicyclic, aromatic, and combinations thereof. Said differently, the carbon chain may have aliphatic sections, alicyclic sections, or aromatic sections and combinations of the different sections.

The carbon chain may also include one or more of the ether linkages or ester linkages. For example, the carbon chain may have a single ether linkage or a single ester linkage or the carbon chain may have a plurality of ether linkages or a plurality ester linkages. Alternatively, the carbon chain may have a combination of ether and ester linkages. It is believed, without intending to be bound by theory, that the ether and/or ester linkages helps to disperse the fluorocarbon resin as a result of such linkages being present therein.

The polyglycidyl oligomer has a weight-average molecular weight of from about 150 to about 1000, preferably from about 250 to about 750, and more preferably from about 350 to about 750. The polyglycidyl oligomer may be formed from various initiator molecules as understood by one of ordinary skill in the art, such as, but not limited to, glycerol, pentaerythritol, trimethyl propane (TMP), or combinations thereof, which can then be epoxidized to form the polyglycidyl oligomer.

The polyglycidyl oligomer is preferably selected from at least one of the following general formulas:

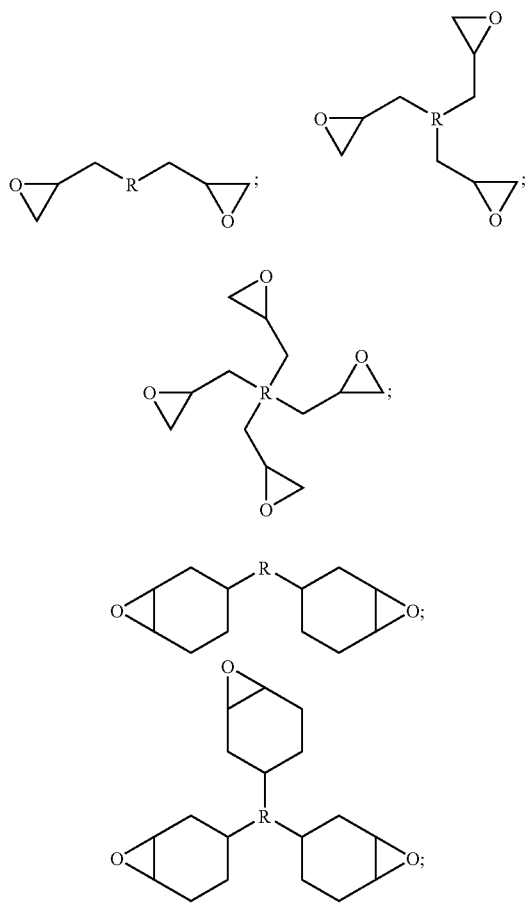

wherein R is the carbon chain. The polyglycidyl oligomer may comprise one or more of the above general formulas and be present as a mixture. One illustrative example of the polyglycidyl oligomer is commercially available as DENACOL® 314 from Nagase & Co. Ltd and has the formula shown below:

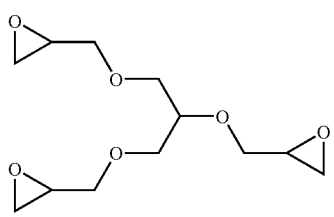

2,2′,2″-(propane-1,2,3-triyltris(oxy))tris(methylene)trioxirane

Another illustrative example of the polyglycidyl oligomer is commercially available as DENACOL® 321 from Nagase & Co. Ltd and has the formula shown below:

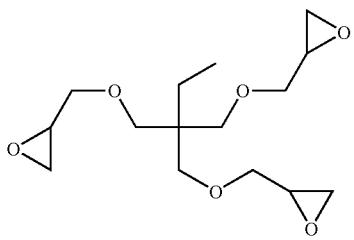

2,2′-(2-ethyl-2-((oxiran-2-ylmethoxy)methyl)propane-1,3-diyl)bis(oxy)bis(methylene)dioxirane Both the DENACOL® 314 and 321 have three epoxy groups and three internal ether linkages. Another illustrative example of the polyglycidyl oligomer having four epoxy groups and four internal ether linkages is commercially available as DENACOL® 411 from Nagase & Co. Ltd and has the formula shown below:

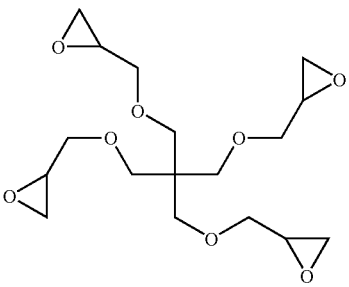

2,2′-(2,2-bis((oxiran-2-ylmethoxy)methyl)propane-1,3-diyl)bis(oxy)bis(methylene)dioxirane Yet another illustrative example of the polyglycidyl oligomer is commercially available as CYRACURE® UVR-6107 from Dow Chemical and has the formula shown below:

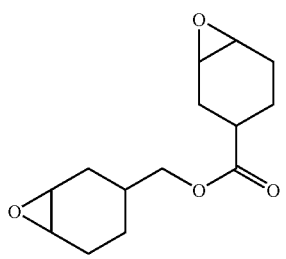

7-oxabicyclo[4.1.0]heptan-3-ylmethyl 7-oxabicyclo[4.1.0]heptane-3-carboxylate

Yet still another illustrative example of the polyglycidyl oligomer is commercially available as CYRACURE® UVR-6128 from Dow Chemical and has the formula shown below:

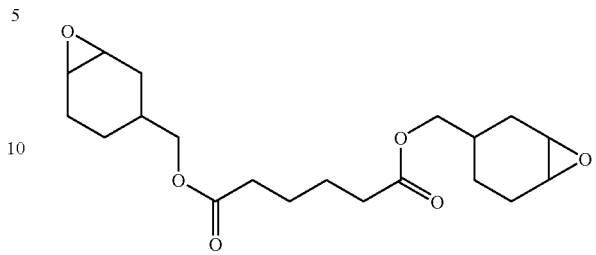

bis(7-oxabicyclo[4.1.0]heptan-3-ylmethyl) adipate

The CYRACURE® UVR-6107 and UVR-6128 both have two epoxy groups and two cyclic groups. However, CYRACURE® UVR-6107 only has one internal ester linkage, whereas CYRACURE® UVR-6128 has two internal ester linkages.

The polyglycidyl oligomer is present in an amount of from about 30 to about 90 percent, preferably from about 50 to about 80 percent, and more preferably from about 50 to about 75 percent, each based on the total weight of the hyperdispersant. It is to be understood that these weight percents exclude solvents unless specifically stated. When the weight percent includes solvents, the polyglycidyl oligomer is present in an amount of from about 10 to about 60 percent based on the total weight of the hyperdispersant.

The hyperdispersant also includes at least one amino compound substituted with a primary or secondary amine group. The amino compound may have a heterocyclic, cyclic, alkyl, or heteroalkyl structure. The amino compound is reacted with the polyglycidyl oligomer such that the primary or secondary amine group opens at least one of the epoxy groups to obtain the hyperdispersant having amine functionality and hydroxyl functionality.

The heterocyclic compound may have at least one nitrogen in place of carbon and may further include at least one oxygen in place of carbon. When the amino compound has the heterocyclic structure, the amino compound has a general ring structure. Suitable heterocyclic amino compounds may be selected from, but not limited to, at least one of ethyleneurea, pyrrolidine, 2-pyrrolidone, piperidine, all oxazolidines and morpholine. When the amino compound has the cyclic structure, the amino compound has a cyclic hydrocarbon with at least one primary or secondary amines. One suitable cyclic amino compound includes dicyclohexyl amine. When the amino compound has an alkyl structure, the alkyl structure includes a hydrocarbon chain that may be branched or linear with at least one primary or secondary amines. Suited alkyl amino compounds include t-butyl amine, isopropylamine, diisopropylamine, 2-amino-2-methyl-1-propanol, and ethanol amine. The heteroalkyl structure includes the hydrocarbon chain and may have at least one primary or secondary amine and/or oxygen as part of the hydrocarbon chain. Suitable heteroalkyl amino compounds include N,N-dimethyl-1,3-propanediamine, dimethyl amine, and diethanol amine.

The amino compound is used in an amount sufficient to react with the plurality of epoxy groups. In other words, the amino compound is present in a stoichiometric equivalent relative to the plurality of epoxy groups of the polyglycidyl oligomer. Generally, the amino compound is present in an amount of from about 15 to about 50 percent, preferably from about 20 to about 45, and more preferably from about 25 to about 40, each based on the total weight of the hyperdispersant. When including the solvent, the amino compound is present in an amount of from about 5 to about 40 percent based on the total weight of the hyperdispersant. The reaction product of the amino compound and the polyglycidyl oligomer reduces the viscosity of the coating composition. Further, the reaction product helps to render the hyperdispersant more compatible with the fluorocarbon resin and thereby stabilizes the viscosity of the coating composition.

The hyperdispersant is present in an amount of from about 1 to about 40 percent based on the total weight of the fluorocarbon coating composition. Preferably, the hyperdispersant is present in an amount of from about 1 to about 20 percent, most preferably from about 1 to about 5, both based on the total weight of the fluorocarbon coating composition. It is to be appreciated by those of ordinary skill in the art that the hyperdispersant aids in dispersing the binder resin. However, the hyperdispersant could be employed without a binder resin by varying other aspects of the formulation. Once the hyperdispersant is formed, the hyperdispersant has a formula weight of from about 200 to about 10,000, preferably from about 350 to about 6,500, and more preferably from about 500 to about 1,000, each based on the total weight of the hyperdispersant.

The coating compositions of the present invention may be based in an organic solvent or mixture of solvents. Suitable solvents include, but are not limited to, glycols, esters, etheresters, glycol-esters, ether-alcohols, aliphatic hydrocarbons, aromatic hydrocarbons, and phthalate plasticizers, either in combination or individually as primary solvents. Solids levels are generally between about 30 and about 90 percent based upon the total weight of the coating composition. Solid levels between about 45 and about 75 percent based upon the total weight of the coating composition are most typical. Examples of suitable solvents include aromatic 100, butyl carbitol acetate, dibasic ester, methyl arnyl ketone, and isophorone.

The coating composition may be clear when used, for example, as a clear coat over a color coat. It may also contain pigments and fillers up to about 30 percent based on the total weight of the coating composition. Types of pigments which might be used in this coating system encompass all pigments used in the coating industry depending on color, physical needs, durability, and chemical resistance. Suitable pigments include inorganic metal oxides, organic compounds, metal flake, and mica pigments, extender or filler pigments, and corrosion-inhibitive pigments, such as chromates, silicas, silicates, phosphates, and molybdates. Both underlying color coat and overlaying clear coat may be formulated in accordance with the subject invention. The coating composition may be applied to a bare metal surface, but is preferably applied to metal, which has been first coated with a primer coat or treated by other known methods including electrocoating. Suitable primers include acrylics, polyesters, and epoxies crosslinked with melamines, blocked isocyanates and phenolics.

Coating compositions in accordance with the present invention may be applied to substrates by a variety of processes. However, the coating compositions are particularly formulated for and useful in coil coating processes. In reverse roll coil coating, the coating compositions are typically applied at peak metal temperatures (PMT) of between about 400 to 500° F. Dwell time at PMT ranges from about 10 seconds to about 5 minutes. If the coating compositions are applied by spray, cure temperatures are similar, but substantially longer cure times are required due to larger metal mass, e.g., about 20 minutes.

The following examples, illustrating the formation of the hyperdispersant and coating composition and illustrating certain properties of the hyperdispersant and coating composition, as presented herein, are intended to illustrate and not limit the invention.

EXAMPLES

A hyperdispersant was formed according to the composition listed in the table below. The amounts in Table 1 are in grams unless otherwise specified.

TABLE 1

Hyperdispersant Formulation

|  | Ex. 1 |
| --- | --- |
| Polyglycidyl Oligomer | 200.0 |
| Amino Compound | 116.8 |
| Solvent | 273.4 |
| Total | 590.2 |

In Example 1, the polyglycidyl oligomer is DENACOL® 314 and the amino compound is piperidine. A mixture of Aromatic 100 (200.0 grams) and the polyglycidyl oligomer is charged to a three-liter resin reaction flask equipped with an agitator, condenser, thermometer, inert gas inlet, and addition funnel. The reactor is flushed with nitrogen and the charge is heated to 70° C. Next, a mixture of Aromatic 100 (58.4 grams) and the amino compound is made and placed in the addition funnel and is added to the reactor over a thirty minute and then the temperature is maintained at 70° C. for sixty minutes. After the addition is complete, the reactor contents are flushed with 15.0 grams of Aromatic 100 and the temperature of the contents is increased 85° C. and held for thirty minutes. The resin is then cooled.

The resulting resin has a solids content of 54-55%, an amine content of 19% on solids, viscosity of A3-A2 (Gardner-Holdt bubble) at 25° C., and weight per gallon of 7.95 LB/GAL.

The hyperdispersant is then incorporated into a fluorocarbon coating composition. The components are listed in percent based upon the total amount of the coating composition, unless otherwise indicated.

TABLE 2

Coating Composition Formulation

|  | Ex. 1 |
| --- | --- |
| Fluorocarbon resin | 20.4% |
| Dispersant/Binder Resin | 8.3% |
| Cross-linking Agent | 0.5 |
| Hyperdispersant | 1% |
| Pigment | 29% |
| Solvent | 40% |
| Acid Catalyst | 0.2% |
| Defoamer | 0.1% |
| Wax Solution | 0.5% |

In Example 1, a pigment dispersion is formed by dispersing 15.8 g of titanium oxide pigment dispersed in a mixture of 5 g hyperdispersant, 5 g binder resin and 20 g of solvent (isophorone). The binder resin is 90% methyl methyacrylate, 5% ethyl methacrylate, and 5% hydroxyethyl methacrylate. The binder resin is reduced with the solvent and hyperdispersant and powdered titanium dioxide pigment is added under agitation. The pigment is completely dispersed using a high-speed blade. The resin, solvent and pigment mixture is then passed through a media mill to achieve complete dispersion. A fluorocarbon base is prepared by dispersing 22.1 g of the fluorocarbon resin (polyvinylidene difluoride (PVDF)) in 4.2 g of binder resin, 1 g of hyperdispersant and 20 g of solvent. Again, the binder resin and hyperdispersant are reduced with solvent and the powdered PVDF is added under agitation and the PVDF is completely dispersed using a high-speed blade.

An intermediate base is prepared by adding the remaining components into the fluorocarbon base. For example, 0.1 g of acid catalyst and 0.5 g of melamine (crosslinking agent) are added to the fluorocarbon base. Likewise, 0.3 g of defoamer and 0.2 g of wax solution were added to the fluorocarbon base.

The coating composition is completed by blending the pigment dispersion and the fluorocarbon base and adjusting the viscosity with the remaining 11.8 g of solvent. Various tests, such as viscosity and density, are run on the final formulation to ensure its compositional integrity. The coating composition is cured by applying a film to a substrate and baking at 392-500° F. (200-260° C.) for 20-60 seconds.

The coating compositions of Example 1 was applied to steel panels and baked 55 seconds at 465° F. to yield 0.75-0.85 mil (0.019-0.022 mm) films. Methylethyl Ketone (MEK) resistance of the film was then measured as the number of double rubs to film failure. Example 1 performed well for 200+ rubs and Comparative Example 1 performed well for 100+ rubs. These results indicate that Example 1 performs at least as well as, if not better than, the coating composition that relied upon MESO. As discussed above, MESO is becoming increasingly difficult and expensive to obtain. Therefore, it was an object of the subject invention to provide an alternate coating composition that performs as well and that is less expensive to manufacture.

Obviously, many modifications and variations of the present invention are possible in light of the above teachings. The invention may be practiced otherwise than as specifically described within the scope of the appended claims.

What is claimed is:

1. A fluorocarbon coating composition comprising:
   a fluorocarbon resin;
   a binder resin;
   a cross-linking agent; and
   a hyperdispersant comprising a reaction product of reactants comprising 1) a polyglycidyl oligomer comprising a carbon chain having from 1 to 25 carbon atoms with an internal ether linkage or an internal ester linkage and comprising a plurality of epoxy groups and 2) at least one amino compound having a cyclic, heterocyclic, alkyl, or heteroalkyl structure substituted with a primary or secondary amine group for reacting with and for opening at least one of said epoxy groups;
   wherein said hyperdispersant has amine functionality from said amino compound to aid in dispersion of said fluorocarbon resin and hydroxyl functionality from opening at least one of said epoxy groups to enhance cross-linking with said cross-linking agent.

2. A fluorocarbon coating composition as set forth in claim 1 wherein said polyglycidyl oligomer is present in an amount of from about 30 to about 90 percent based on the total weight of said hyperdispersant.

3. A fluorocarbon coating composition as set forth in claim 2 wherein said amino compound is present in an amount of from about 15 to about 50 percent based on the total weight of said hyperdispersant.

4. A fluorocarbon coating composition as set forth in claim 1 wherein said polyglycidyl oligomer has a weight-average molecular weight of from about 150 to about 1000.

5. A fluorocarbon coating composition as set forth in claim 1 wherein said carbon chain is selected from linear, branched, and combinations thereof.

6. A fluorocarbon coating composition as set forth in claim 1 wherein said carbon chain is selected from aliphatic, alicyclic, aromatic, and combinations thereof.

7. A fluorocarbon coating composition as set forth in claim 1 wherein said polyglycidyl oligomer is selected from the following general formulas and mixtures thereof:

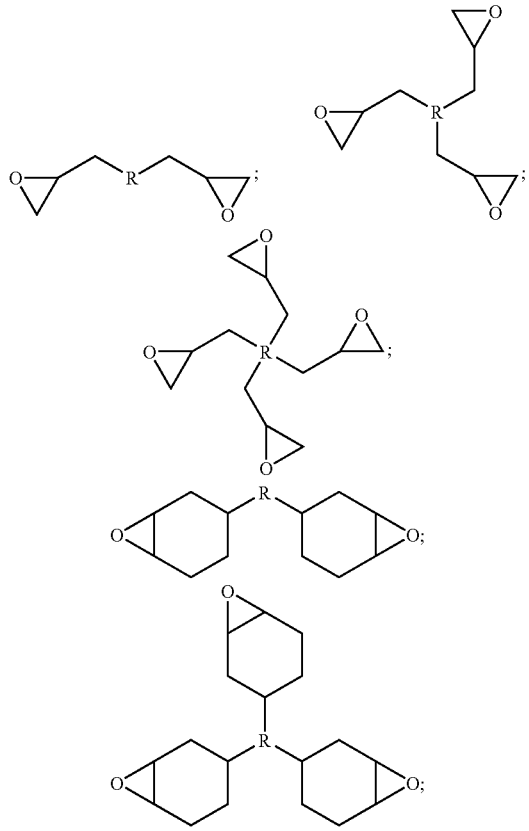

wherein R is said carbon chain.

8. A fluorocarbon coating composition as set forth in claim 1 wherein said amino compound is selected from ethyleneurea, pyrrolidine, 2-pyrrolidone, piperidine, morpholine, t-butyl amine, isopropylamine, diisoproylamine, 2-amino-2-methyl-1-propanol, ethanol amine, dicyclohexyl amine, N,N-dimethyl-1,3-propanediamine, dimethyl amine, diethanol amine and combinations thereof.

9. A fluorocarbon coating composition as set forth in claim 1 further comprising pigments dispersed in said fluorocarbon resin.

10. A fluorocarbon coating composition as set forth in claim 1 having a solids content of from about 30 to about 70 percent.

11. A fluorocarbon coating composition as set forth in claim 1 wherein said fluorocarbon resin is present in an amount of from about 30 to about 99 percent based on the total weight of said fluorocarbon coating composition.

12. A fluorocarbon coating composition as set forth in claim 1 wherein said hyperdispersant is present in an amount of from about 1 to about 40 percent based on the total weight of said fluorocarbon coating composition.

13. A fluorocarbon coating composition as set forth in claim 1 wherein said cross-linking agent is present in an amount of from about 0.2 to about 10 percent based on the total weight of said fluorocarbon coating composition.

14. A fluorocarbon coating composition as set forth in claim 1 wherein said fluorocarbon resin is a fluorocarbon powder.

* * * * *